US012763251B2

(12) United States Patent
Tirilly

(10) Patent No.: US 12,763,251 B2
(45) Date of Patent: Oct. 13, 2026

(54) POWER TRANSFORMER ASSEMBLY

(71) Applicant: General Electric Technology GmbH, Baden (CH)

(72) Inventor: Serge Tirilly, Massy (FR)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 952 days.

(21) Appl. No.: 18/004,373

(22) PCT Filed: Jun. 22, 2021

(86) PCT No.: PCT/EP2021/066923
§ 371 (c)(1),
(2) Date: Jan. 5, 2023

(87) PCT Pub. No.: WO2022/008227
PCT Pub. Date: Jan. 13, 2022

(65) Prior Publication Data

US 2023/0282413 A1 Sep. 7, 2023

(30) Foreign Application Priority Data

Jul. 6, 2020 (EP) .................................... 20184187

(51) Int. Cl.
*H01F 30/12* (2006.01)
*H02H 7/04* (2006.01)
*H02J 3/1878* (2026.01)

(52) U.S. Cl.
CPC ............... *H01F 30/12* (2013.01); *H02H 7/04* (2013.01); *H02J 3/1878* (2013.01)

(58) Field of Classification Search
CPC .......... H01F 30/12; H02H 7/04; H02J 3/1878; Y02E 40/10
USPC ..................... 336/5, 148, 170–173, 213–214
See application file for complete search history.

(56) References Cited

U.S. PATENT DOCUMENTS

| | | | | |
|---|---|---|---|---|
| 5,455,759 A * | 10/1995 | Paice | H02M 7/17 363/5 |
| 9,667,163 B1 * | 5/2017 | Damjanovic | H02M 5/14 |
| 2007/0041137 A1 * | 2/2007 | Thompson | H02H 7/045 361/85 |

(Continued)

FOREIGN PATENT DOCUMENTS

| | | | | |
|---|---|---|---|---|
| EP | 0725470 A1 * | 8/1996 | H02H 7/055 |
| EP | 3232452 A1 | 10/2017 | |
| WO | 9615572 A1 | 5/1996 | |

OTHER PUBLICATIONS

Ba, et al.: Rotary Power-Flow Controller for Dynamic Performance Evaluation—Part I: RPFC Modeling. IEEE Transactions on Power Delivery, vol. 24, No. 3, pp. 1406-1416, Jul. 2009.

(Continued)

*Primary Examiner* — Tuyen T Nguyen
(74) *Attorney, Agent, or Firm* — Eversheds Sutherland (US) LLP

(57) ABSTRACT

The present application concerns a transformer assembly. The transformer assembly includes a step-up transformer, a step-down transformer, and a phase shifting transformer having a source side and a load side connected, respectively, to the step-down transformer and the step-up transformer.

7 Claims, 6 Drawing Sheets

Delta extended symmetric

(56) References Cited

U.S. PATENT DOCUMENTS

2009/0140577 A1 * 6/2009 Fishman ................ H02M 7/49
307/82

OTHER PUBLICATIONS

International Search Report and Written Opinion for PCT/EP2021/066923, dated Sep. 13, 2021, 10 pages.

* cited by examiner

POWER TRANSFORMER ASSEMBLY

TECHNICAL FIELD

The invention relates to a transformer assembly, and in particular to a transformer assembly which comprises a phase shifting transformer. The transformer assembly according to the present invention is a more flexible and cost effective solution compared to phase shifting transformers known from prior art.

PRIOR ART

It is widely known that the active power distribution flow between parallel transmission lines may be uneven. The active power flow distribution is in particular dictated by the impedance of each line. Notably, the largest part of the active power flow is generally carried by the transmission line having the smallest impedance.

Therefore, in order to regulate the active power flow between each transmission line, it is generally contemplated to implement a phase shifting transformer (hereafter "PST").

Such a PST is notably a power transformer which induces a phase shift between a receiving side and a sending side of said transformer.

To this regard, FIG. 1 illustrates a single core PST 1 in a delta extended symmetric configuration called D S0-3/9 as proposed in the standard [1] cited at the end of the description.

According to this configuration, the PST 1 comprises a delta connected excitation winding and tap windings outside the delta. This PST is generally housed in a single tank.

However, the performances of this PST 1 are limited.

In particular, this PST 1 exhibits a very low impedance around the zero phase shift position, so that, in case of short-circuit, said PST 1 may undergo damages. Therefore this PST 1 generally imposes the implementation of protections preventing short-circuit.

Besides, its use is limited to rather low line voltage, and in particular less than 245 kV. In other words, the consideration of higher voltages would impose to adopt a two cores configuration housed in two different tanks. This later aspect is neither satisfactory insofar as it increases operation and maintenance costs.

Alternatively, FIG. 2 illustrates an example of a two core symmetrical design PST 2 called YNyn/IIId S0-3/9 as proposed in the standard [1] cited at the end of the description. According to this configuration, the PST 2 comprises a star connected excitation winding and a star connected tap winding on a first core with a delta connected excited winding and series windings on a second core.

This configuration can be used at higher line voltages than the D S0-3/9 configuration, and can withstand short circuit.

However, this configuration is not cost effective and has a too large footprint.

Therefore, it is an object of the present invention to propose a transformer assembly that can be used at high line voltages.

It is also an object of the present invention to propose a transformer assembly that can withstand short-circuits.

Finally, it is also an object of the present invention to propose a cost effective transformer assembly.

SUMMARY OF THE INVENTION

The aforementioned objects are, at least partly, achieved by a transformer assembly which comprises:

- a step-up transformer (20);
- a step-down transformer (30);
- a phase shifting transformer (40) having a source side and a load side connected, respectively, to the step-down transformer and the step-up transformer.

According to one embodiment, the phase shifting transformer comprises a single-core phase shifting transformer with delta connected excitation windings and tap windings.

According to one embodiment, each tap windings comprises a load tap winding and a source tap winding connected, respectively, to the step-up transformer and the step down transformer.

According to one embodiment, the step-up transformer and/or the step-down transformer comprises an autotransformer.

According to one embodiment, the step-up transformer and the step-down transformer are identical.

According to one embodiment, the step-down transformer comprises a voltage regulation function, while the step-up transformer comprises a constant phase shift angle function.

According to one embodiment, the voltage regulation function comprises secondary tap winding magnetically associated with windings of the considered autotransformer.

According to one embodiment, one and/or the other of the step-down transformer and the step-up transformer comprises constant phase shift angle function.

The invention also concerns a three phase power transmission line which comprises the assembly according to the present invention.

BRIEF DESCRIPTION OF THE DRAWINGS

Other characteristics and advantages shall appear in the following description of embodiments of the transformer assembly according to the invention, given by way of non-limiting examples, in reference to the annexed drawings wherein.

DETAILED DESCRIPTION OF SPECIFIC EMBODIMENTS

The present invention concerns a transformer assembly 10 which comprises:

- a step-down transformer 20;
- a step-up transformer 30;
- a phase shifting transformer 40 having a source side and a load side connected, respectively, to the step-down transformer and the step-up transformer.

The present invention is described in the context of a three-phase network. In particular, without it being necessary to specify it and unless otherwise indicated, the mention of a winding will refer to a given phase.

Figure 1:
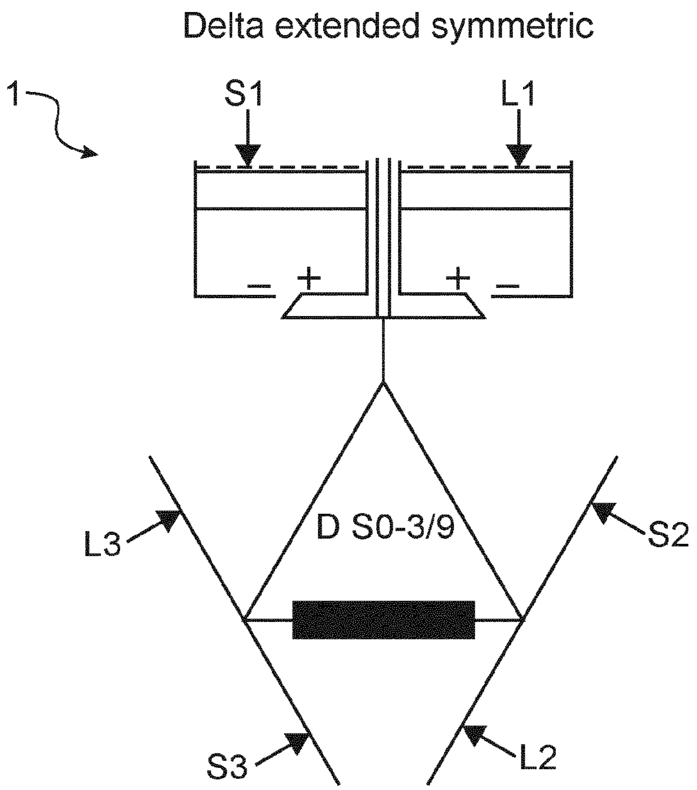
FIG. 1 illustrates a single core PST in a delta extended symmetric configuration called D S0-3/9 as proposed in the standard [1]
Figure 2:
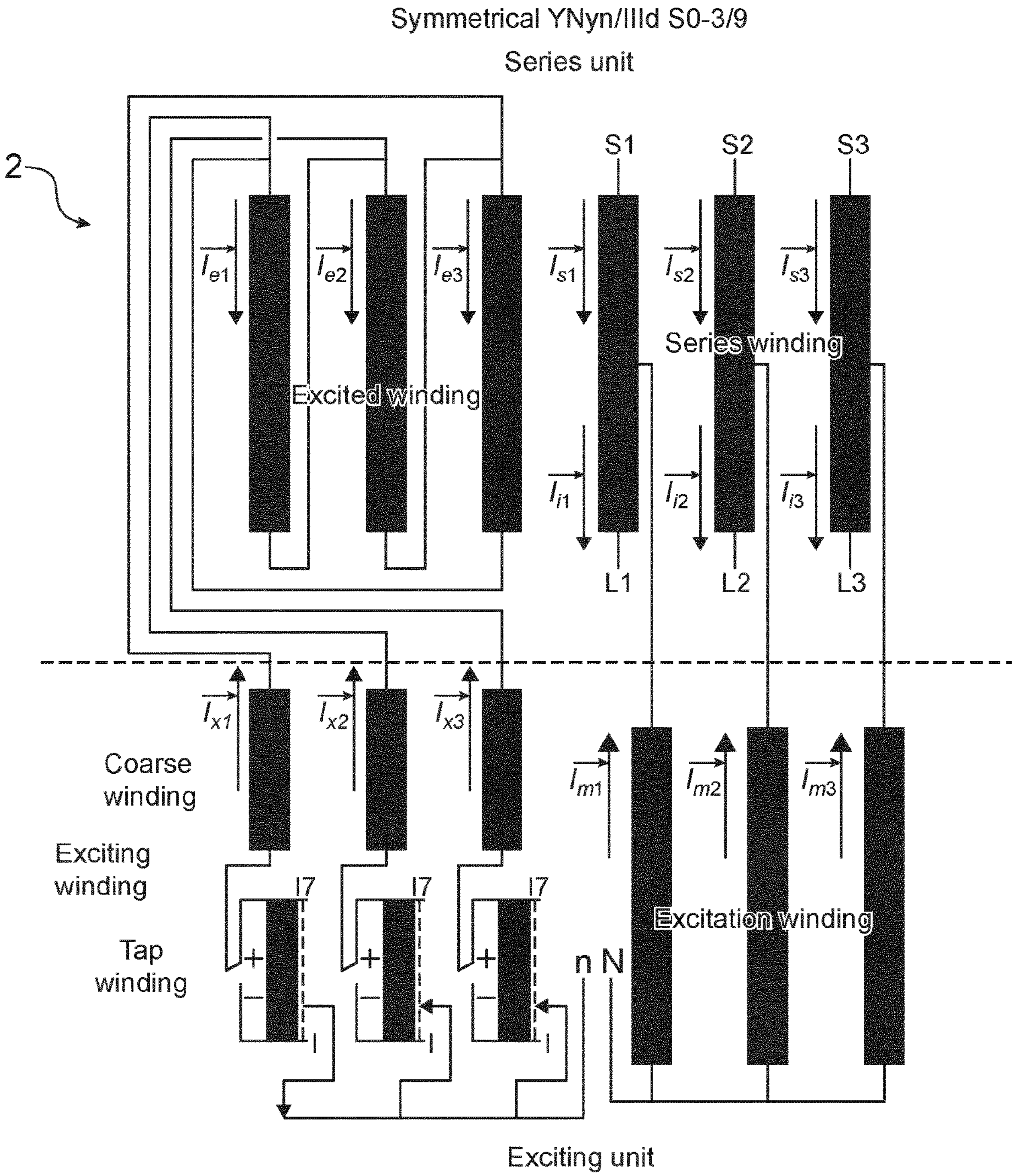
FIG. 2 illustrates an example of a two cores symmetrical design PST called YNyn/IIId S0-3/9 as proposed in the standard [1]
Figure 3:
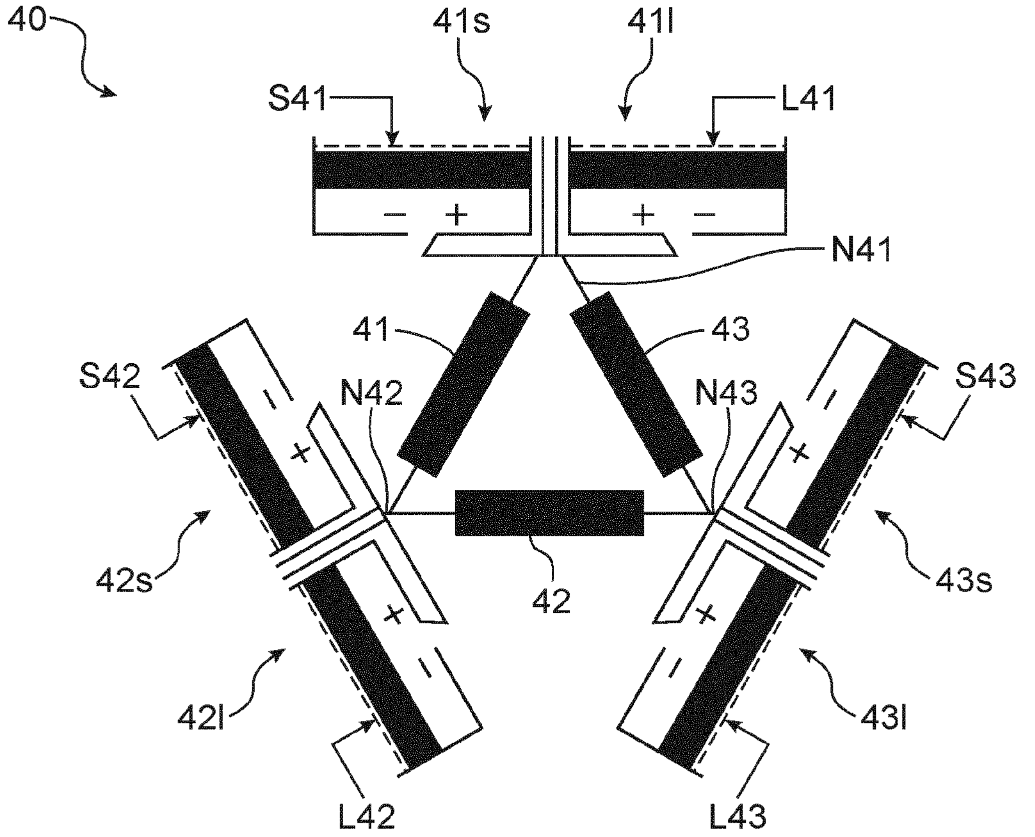
FIG. 3 illustrates a phase shifting transformer 40 likely to be implemented in the context of the present invention.

FIG. 3 illustrates a phase shifting transformer 40 likely to be implemented in the context of the present invention. The present invention is however not limited to this sole phase shifting transformer configuration.

Notably, the phase shifting transformer 40 comprises three excitation windings 41, 42, 43 connected in series, and in particular in a delta arrangement. This phase shifting transformer 40, denoted D S0-3/9 in the standard [1], is generally housed in a single tank.

The phase shifting transformer 40 further comprises windings, said tap windings, for which voltage is made adjustable with a tap regulator. In particular, the phase shifting transformer 40 comprises, at each node N41, N42, N43 of the delta arrangement, a source tap winding 41*s*, 42*s*, 43*s* and a load tap winding 41*l*, 42*l*, 43*l*. The source tap windings 41*s*, 42*s*, 43*s* and the load tap windings 41*l*, 42*l*, 43*l* form, respectively, a source side and a load side of the phase shift transformer 40.

Each source tap winding 41*s*, 42*s*, 43*s* comprises a source side terminal S41, S42, S43, while each load tap winding 41*l*, 42*l*, 43*l* comprises a load side terminal L41, L42, L43.

Figure 4:
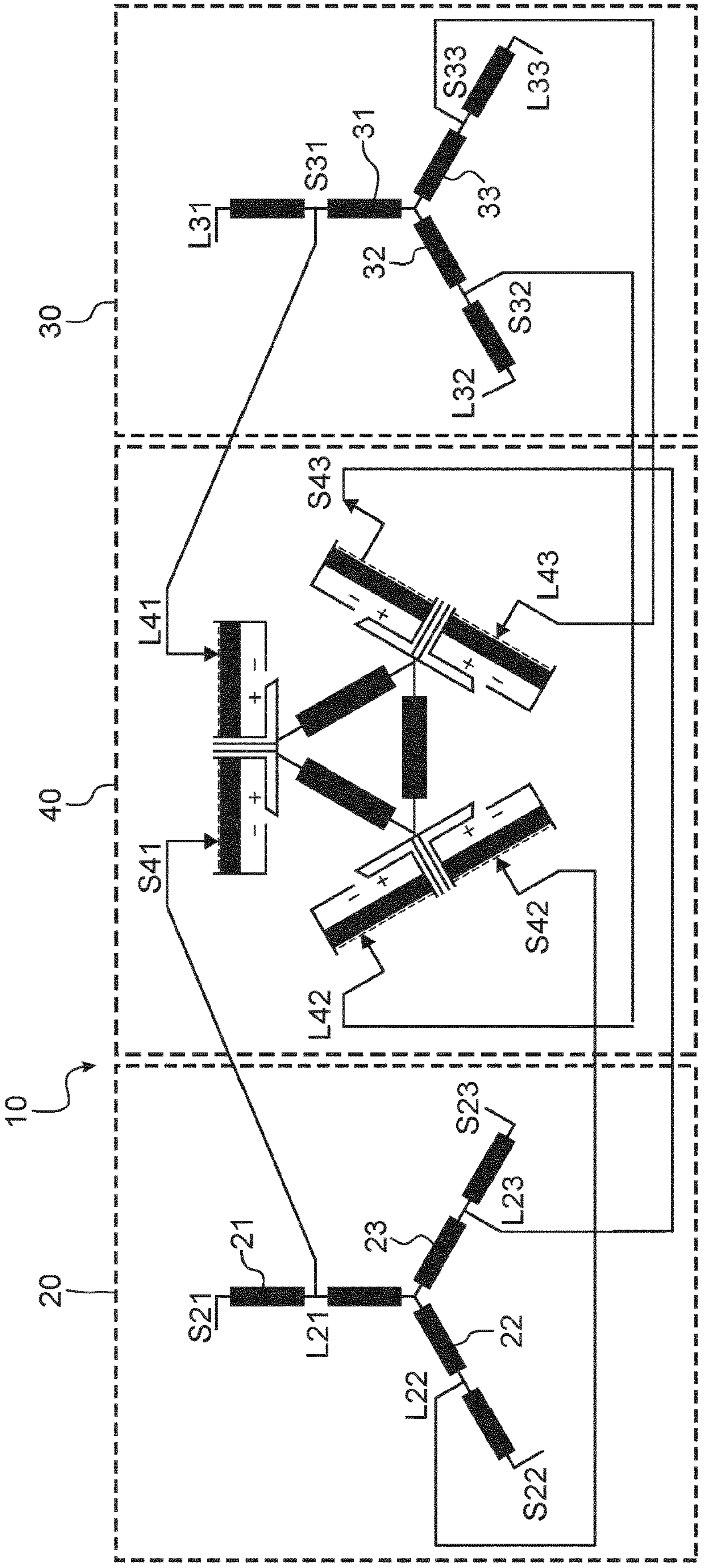
FIG. 4 illustrates a first embodiment of the present invention implementing the phase shifting transformer of FIG. 3.

FIG. 4 illustrates a first embodiment of the present invention implementing the phase shifting transformer of FIG. 3.

According to this first embodiment, the step-down transformer 20 as well as the step-up transformer 30 comprise an auto-transformer.

In this embodiment, the phase shifting transformer 40 is intercalated in between the step-down transformer 20 and the step-up transformer 30.

According the present invention, an autotransformer comprises three windings arranged in a star configuration.

In particular, the step-down transformer 20 comprises three windings 21, 22, 23 arranged in a star configuration. Each winding 21, 22, 23 comprises a source terminal S21, S22, S23 intended to be connected to the source side of a three phase transmission line. Each of said windings also comprises a load terminal L21, L22, L23 connected, respectively, to the source tap windings 41*l*, 42*l*, 43*l* of the phase shifting transformer.

In a similar manner, the step-up transformer 30 comprises three windings 31, 32, 33 arranged in a star configuration. Each winding 31, 32, 33 comprises a load terminal L31, L32, L33 intended to be connected to the load side of the three phase transmission line. Each of said windings also comprises a source terminal L31, L32, L33 connected, respectively, to the load tap windings 41*l*, 42*l*, 43*l* of the phase shifting transformer 40.

Therefore, according to this arrangement, wherein the phase shifting transformer 40 is intercalated in between the step-down transformer 20 and the step-up transformer 30, it is possible to adapt the operating voltage via said step-down and step-up transformers. In other words, a transformer operating at low voltage, for example less than 245 kV, can be considered. In particular, a phase shifting transformer having a single core symmetric design (i.e: D S0-3/9) can advantageously be implemented.

Furthermore, this arrangement with the two transformers 20 and 30 insures a minimum impedance of the assembly even at zero phase-shift angle so that no additional protection against short-circuit is required.

Besides, the footprint and the cost of this assembly are reduced compared to two sets of two-core phase shifting assembly which may be required when operated a higher voltages, and in particular at voltages higher than 245 kV.

Figure 5:
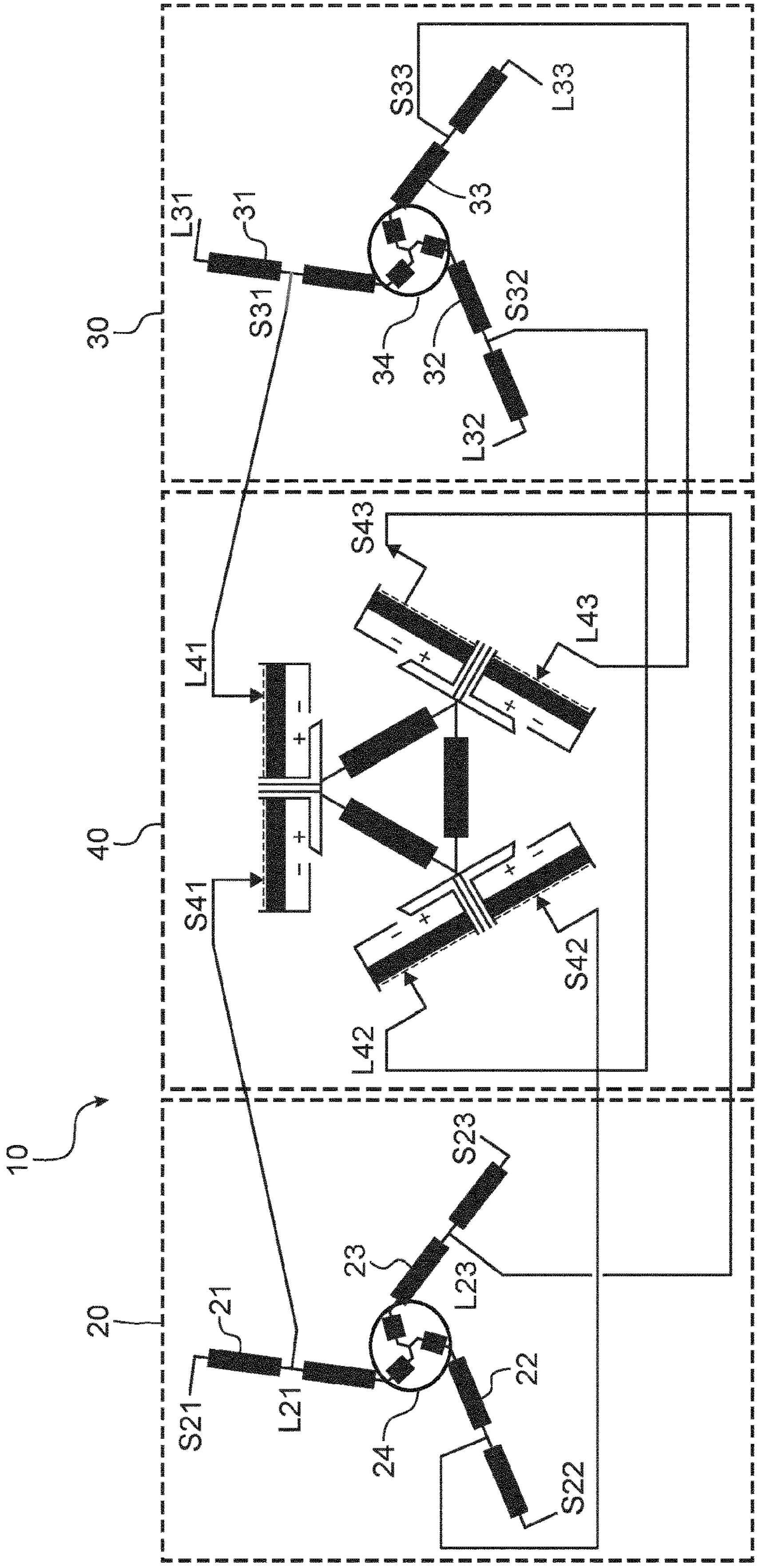
FIG. 5 illustrates a second embodiment of the present invention implementing the phase shifting transformer of FIG. 3.

FIG. 5 illustrates a second embodiment of the present invention implementing the phase shifting transformer of FIG. 3.

This second embodiment differs from the first embodiment in that at least one of the step-down transformer 20 and the step-up transformer 30 comprises a constant phase-shift angle function 24, 34. In particular, this constant phase-shift angle function is intended to impose a phase-shift angle to compensate an angle drop stemming from the load. For example, the step-down transformer 20 and the step-up transformer 30 may be arranged to induce the same phase-shift angle to the voltage.

As exemplified in FIG. 5, the constant phase-shift function 24, 34 involved a magnetic coupling of a section of the windings of the considered autotransformer.

Figure 6:
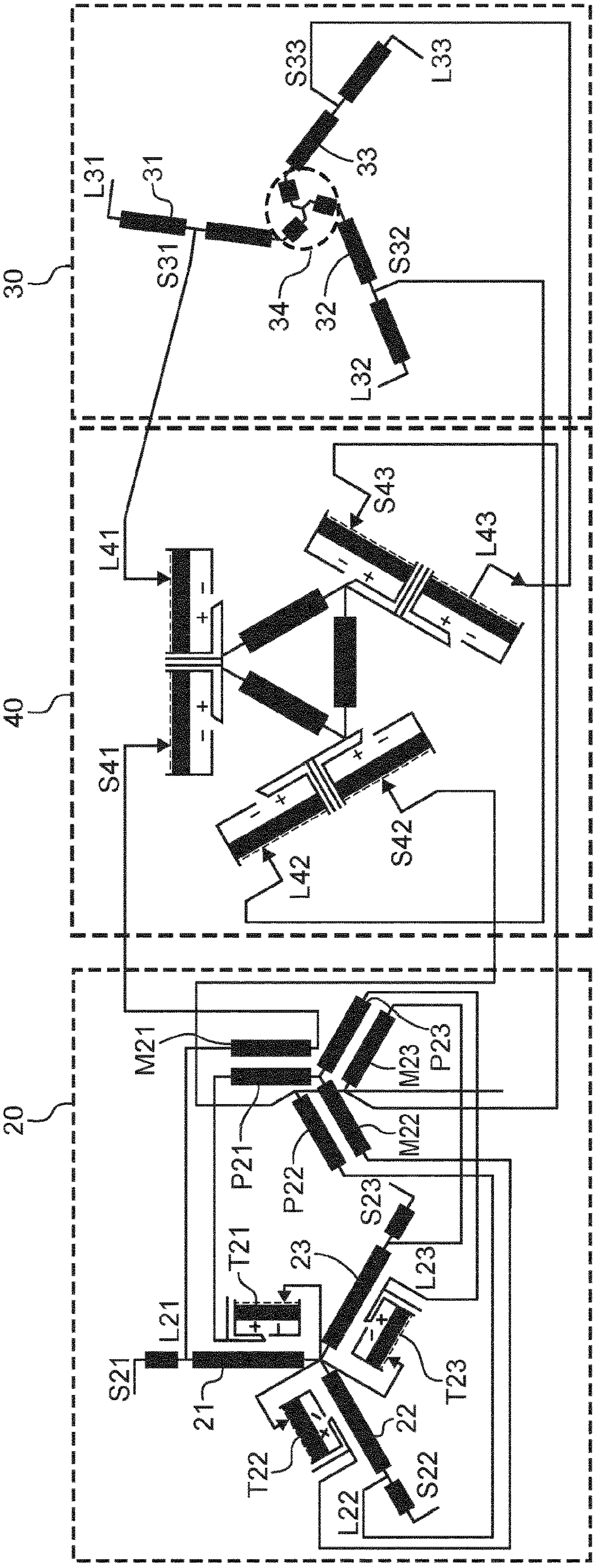
FIG. 6 illustrates a third embodiment of the present invention implementing the phase shifting transformer of FIG. 3.

FIG. 6 illustrates a third embodiment of the present invention implementing the phase shifting transformer of FIG. 3.

This third embodiment differs from the first embodiment in that the step-down transformer 20 comprises a voltage regulation function whereas the step-up transformer 30 comprises the constant phase-shift angle function 34 as described in the second embodiment.

In particular, the step-down transformer 20 comprises star connected windings 21, 22, 23, having source terminals S21, S22, S23, and load terminals L21, L22, L23. The step-down transformer 20 further comprises tap windings T21, T22, T23, and star connected primary windings P21, P22, P23 for the voltage regulation. The step-down transformer 20 also comprises secondary windings M21, M22, M23 magnetically coupled with the primary windings P21, P22, P23.

REFERENCES

[1] IEC IEEE 60076-57-1202.

I claim:

1. A transformer assembly which comprises:

a step-up transformer;

a step-down transformer;

a phase shifting transformer having a source side and a load side connected, respectively, to the step-down transformer and the step-up transformer, wherein the phase shifting transformer comprises a single-core phase shifting transformer with delta connected excitation windings and tap windings, and further wherein each tap winding comprises a load tap winding and a source tap winding connected, respectively, to the step-up transformer and the step-down transformer.

2. The assembly according to claim 1, wherein the step-up transformer and/or the step-down transformer comprises an autotransformer.

3. The assembly according to claim 2, wherein the step-up transformer and the step-down transformer are identical.

4. The assembly according to claim 2, wherein the step-down transformer comprises a voltage regulation function, while the step-up transformer comprises a constant phase shift angle function.

5. The assembly according to claim 4, wherein the voltage regulation function comprises secondary tap winding magnetically associated with windings of the considered autotransformer.

6. The assembly according to claim 2, wherein one and/or the other of the step-down transformer and the step-up transformer comprises constant phase shift angle function.

7. A three phase power transmission line which comprises the assembly according to claim 1.

* * * * *